United States Patent
Hull et al.

[11] Patent Number: 6,025,663
[45] Date of Patent: Feb. 15, 2000

[54] OPERATING MECHANISM FOR CLOSURE MEMBER

[76] Inventors: Frank Peter Hull, 121 East 82nd Str. Apt. 4, New York, N.Y. 10028-0876; Robert Alexander Hull, P.O. Box 25043 Mon. Park, 0105, South Africa

[21] Appl. No.: 08/740,862

[22] Filed: Nov. 4, 1996

[30] Foreign Application Priority Data

Dec. 6, 1995 [ZA] South Africa .......................... 95/10339

[51] Int. Cl.⁷ .............................. H02K 7/102; E05F 3/00; E05F 15/10
[52] U.S. Cl. .............................. 310/75 R; 310/77; 49/28; 49/334
[58] Field of Search ...................................... 310/77, 75 R; 16/DIG. 7, DIG. 17, DIG. 20; 160/331, 904, 188, 189; 49/348, 349, 333, 334, 335, 336, 28

[56] References Cited

U.S. PATENT DOCUMENTS

| | | | |
|---|---|---|---|
| 1,235,639 | 9/1917 | Benjamin | 16/DIG. 17 |
| 3,096,453 | 7/1963 | Behar | 310/77 |
| 4,103,763 | 8/1978 | Glockner et al. | 192/2 |
| 4,129,797 | 12/1978 | Lindner | 310/77 |
| 4,564,791 | 1/1986 | Brickner | 318/16 |
| 4,668,899 | 5/1987 | Ide et al. | 318/280 |
| 4,734,604 | 3/1988 | Sontheimer et al. | 310/76 |
| 5,406,180 | 4/1995 | Feller | 318/372 |
| 5,437,351 | 8/1995 | Lindner | 188/18 A |

*Primary Examiner*—Nestor Ramirez
*Assistant Examiner*—Burton Mullins

[57] ABSTRACT

A self-locking drive, for use in door/gate operators is disclosed. The method/means incorporates an electric motor, which has a rotor assembly that can slide axially in its casing. A brake cone is fixed to the rotor-shaft, which can engage a complimentary brake cone that is attached to the motor casing. At rest these brake cones are very lightly engaged due to an axially mounted spring. The components of the system are designed and configured that any attempt to open the closed door/gate results in the brake cones being forced tighter together. This results in further engagement of the of the brake cones which further resist opening of door/gate. The forcing of the cones together is achieved by helical spur gearing. During motorized closing, the stator's centering pull on the rotor at full load, just balances the axial thrust due to the meshing helical gearing. Consequently, the brake cones do not engage during closing of door/gate. The slope angle of the brake cones is chosen so that in the opening direction, the centering pull of the rotor plus the axial pull due to the helical gears, will release the engaged cones.

7 Claims, 1 Drawing Sheet

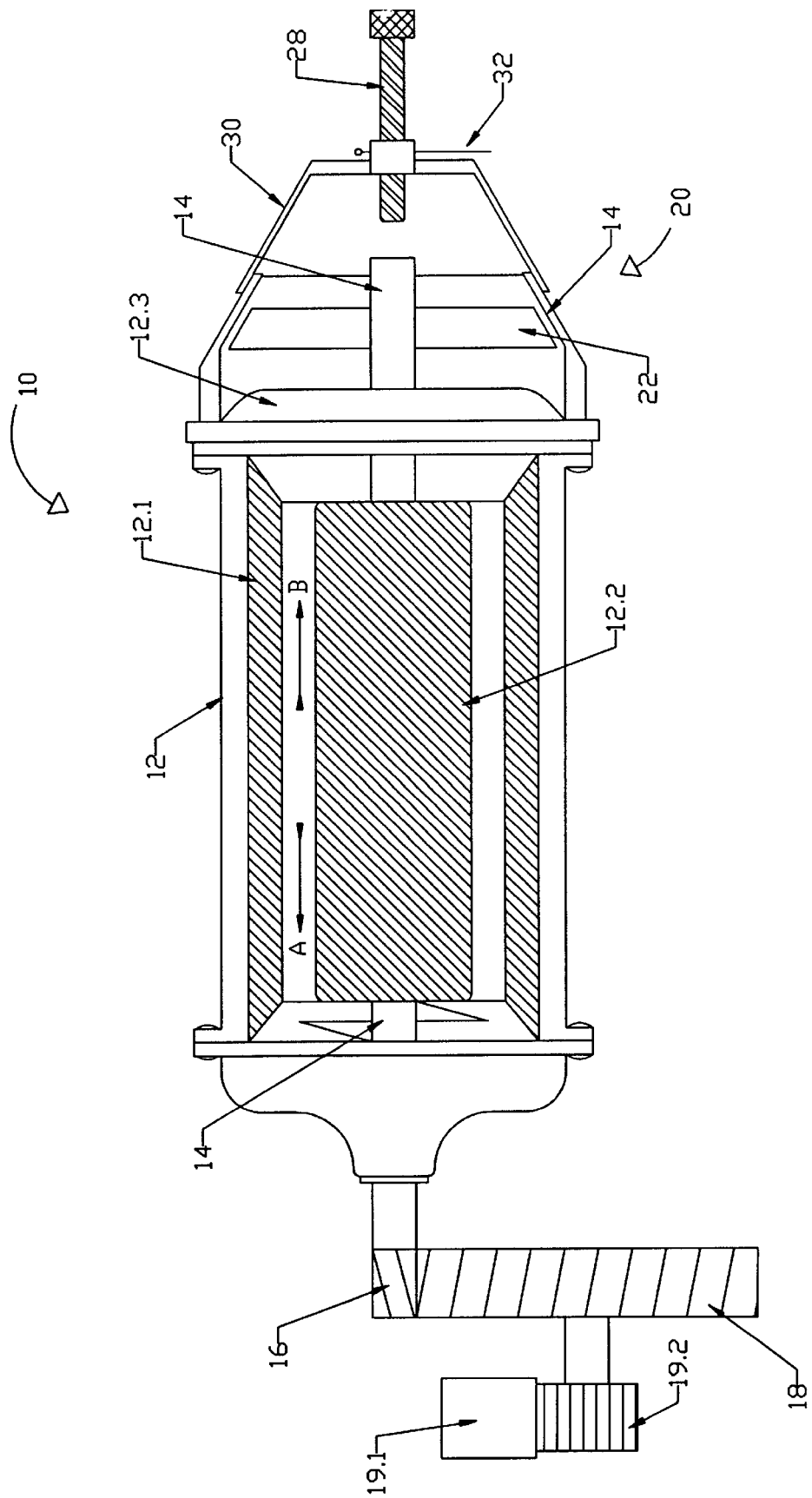

OPERATING MECHANISM FOR CLOSURE MEMBER

BACKGROUND OF THE INVENTION

This invention relates to an operating mechanism for a closure member such as a door, a gate, a window or the like.

Mechanisms which operate closure members are widely known. To date those mechanisms that prevent the opening of a door/gate/window usually incorporate worm and wheel gearing systems. Worm and wheel gearing systems at this level of motor shaft power (50 to 375 watts) is ineffective due to the high gear teeth rubbing speeds. To overcome this problem a larger motor and a sealed oil filled gear box are required.

The invention set out herein utilises a different locking technique which allows the use of a smaller motor and no gear box to achieve the same useful result as a worm and wheel drive system at considerably less expense.

SUMMARY OF THE INVENTION

According to the invention, an operating mechanism for a closure member comprises an electric motor adapted to drive a drive gear and having at least one end shield and a shaft axially displaceable; and braking means: characterised therein that any rotational force on the shaft emanating from the drive gear causes the shaft to displace axially which in turn activates the braking means.

In this specification any reference to a "closure member" includes a door, gate and a window.

In a preferred form of the invention the braking means is in the form of a brake cone mounted concentrically to the shaft, the cone adapted to bear against a conical braking surface which is attachable to the end shield of the motor.

In one form of the invention biasing means is provided to urge the brake cone lightly against the braking surface.

In a preferred form of the invention, the motor includes a stator and a rotor which is attached to the shaft, characterised therein that when the motor is energised, the rotor is adapted to be centred with reference to the stator which causes the shaft to centralise accordingly, causing the brake cone to be displaced away from the braking surface.

With the above arrangement, when the motor is not energised, the brake cone bears lightly against the braking surface. If any rotational force is then applied on the shaft, for example from the drive gear, the shaft displaces axially, in one direction, forcing the brake cone against the braking surface. This action resists any further rotation of the shaft. However, when the motor is energised, the electromagnetic "centring" pull causes the shaft to centralise in relation to the stator of the motor, ie it displaces in the opposite direction, which disengages the braking means and the shaft rotates the drive gear as normal.

In one form of the invention, helical gear teeth are cut in the end of the shaft, the gear teeth being adapted to rotate the drive gear.

Preferably the shaft includes a four tooth helical gear with a helix angle of between 14° and 18°.

Preferably, the angles of the brake cone and conical braking surface are between 10° and 30°.

BRIEF DESCRIPTION OF THE DRAWING

The invention is further described by way of example with reference to the accompanying drawing which is a schematic, sectioned side view of an operating mechanism according to the invention.

DESCRIPTION OF PREFERRED EMBODIMENT

In the drawing, an operating mechanism 10 for a closure member (not shown) is shown to comprise an electric motor 12 having a stator 12.1 and a rotor 12,2 to which a central shaft 14 is attached. At the one end 14.2 of shaft 14, a four tooth helical gear 16 is cut. Helical gear 16 is adapted to drive a drive gear 18, which in turn may be employed to drive a closure member such as a gate or the like. Shaft 14 includes at its opposite end a braking means 20 in the form of a brake cone 22 mounted concentrically on shaft 14. A conical braking surface 24, is attached to end plate 12.3 of motor 12. Brake cone 22 is adapted to bear in use against braking surface 24. Shaft 14 is axially displaceable in directions A/B within the motor casing 12. Biasing means in the form of a spring 26 is provided to urge shaft 14 and cone 22 lightly in direction B so that the latter bears lightly against conical braking surface 24 when the motor 12 is not energised. The location of the spring 26 may be any where along the shaft to achieve the required biassing In use, when motor 12 is energised, shaft 14 centralises (ie moves in direction A) with reference to the stator 12.1 and cone 22 is displaced away from the braking surface 24. Shaft 14 rotates and drive gear 18, which has a complementary helical gear configuration, is rotated by shaft 14.

When the motor 12 is not energised, the shaft 14 moves in direction B under the biasing force of spring 26 until it bears lightly against conical braking surface 24.

In the event of someone attempting to move, particularly open, the closure member (not shown) gear 18 will start to rotate and exert a rotational force on shaft 14. Due to the helical gear configuration, the shaft 14 will tend to resist rotation and will rather tend to be displaced in direction B. This of course has the effect of increasing the pressure of conical brake 22 on the braking surface 24 which further resists rotation of the shaft.

The cone angle of cone 22 and conical braking surface 24 can be between 10° and 30° depending on the frictional force between the cone and the braking surface. In this embodiment, the helix angle on gears 18 and 16 is between 14° and 18°. This helix can be either left hand or right hand slope depending on the direction of locking desired.

It will be appreciated that the spring 26 must have a relatively low biasing force which can readily be overcome by the centring pull on the rotor 12.2 when the motor is energised. Furthermore any toothed rack 19.1 used with the mechanism to control a closure member will have to be mounted above or below the pinion gear 19.2 because the braking action can only be achieved by this drive system in one direction of rotation. This is a minor problem for gate operators and virtually no problem for door operators. Alternatively, left hand or right hand helix slope gears must be utilised if the rack position and opening direction are not selectable.

If the motor is used in a vertical position a counterbalancing spring and a thrust bearing (not shown) are required to support the weight of the rotor/shaft assembly. The cone 22 should seat on the braking surface 24 with a force of between 0 to 1.5 N.

In the drawing, a lock release mechanism in the form of bolt 28, mounted in a threaded support 30 is provided. Support 30 is in this embodiment spot welded to braking surface 24 assembly. In use, if bolt 28 is advanced in direction C, it bears against shaft 14 and pushes cone 22 away from braking surface 24. Bolt 28 can be locked in various positions by means of pin 32 which is shown to extend through one of two holes (not shown) through bolt 28 for this purpose.

When the mechanism as described with reference to the drawing is applied as an overhead door operator, it would be advantageous to allow sufficient axial travel of shaft 14 so that cone 22 can contact both the braking surface 24 and the end plate 12.3 of the motor 12. Contact between the cone 22 and the end plate 12.3 provides some braking action in the closing direction, as opposed to contact between the cone 22 and surface 24 in the opening direction. Braking action in the closing direction is useful to hold the door in the up or open position against, for example, the force of wind.

When the mechanism is applied as a sliding gate operator, there is no advantage to the arrangement described in the preceding paragraph. Unrestricted closing, ie no braking action in the closing direction, of the gate is more advantageous than partial braking as described in the preceding paragraph.

It will be appreciated that many variations or modifications of the invention are possible without departing from the scope of the appended claims.

We claim:

1. An operating mechanism for a closure member comprising:

an electric motor with an axially displaceable, rotatable rotor shaft extending from the motor at the first end thereof;

a helical gearing on the rotor shaft at said first end;

a brake assembly on the rotor shaft at the other end of the motor;

the helical gearing on the rotor shaft engaging a mating drive gear which drives the closure member;

said brake assembly compromising a brake cone concentrically mounted on the rotor shaft and adapted to engage a conical braking surface;

and a spring means for biasing the rotor shaft and said brake cone when said motor is not energized such that said cone bears lightly against said conical braking surface;

whereby any rotational force applied to the rotor shaft from the drive gear displaces the rotor shaft axially such that said cone is forced against said conical braking surface and rotation of rotor shaft is prevented.

2. The operating mechanism for a closure member according to claim 1 wherein:

said conical braking surface is an integral part of an end shield of the motor, or is attached thereto.

3. The operating mechanism for a closure member according to claim 2 wherein:

said drive gear is coupled to the closure member via a toothed rack and pinion gear.

4. The operating mechanism for a closure member according to claim 1 wherein:

said gear is coupled to the closure member via a sprocket and chain.

5. The operating mechanism for a closure member according to claim 1 wherein:

when said motor is energized and during a closing operation, a magnetic centering force causes the rotor to move axially to release said braking cones and counter-balance the axial force generated due to the meshing of said helical gears.

6. The operating mechanism for a closure member according to claim 1 wherein:

the helix angle of said helical gearing and the mating drive gear is between 14 and 18 degrees.

7. The operating mechanism for a closure member according to claim 1 wherein:

the slope angle of said cone lies between 10 and 30 degrees.

* * * * *